US008521643B2

(12) United States Patent
Wisecarver, III et al.

(10) Patent No.: US 8,521,643 B2
(45) Date of Patent: Aug. 27, 2013

(54) SYSTEM AND METHOD FOR ON-LINE PAYMENT TRANSACTIONS

(75) Inventors: William H. Wisecarver, III, Rosslyn, VA (US); Mary F. Nugent, Rosslyn, VA (US)

(73) Assignee: William H. Wisecarver, III, Las Vegas, NV (US)

( * ) Notice: Subject to any disclaimer, the term of this patent is extended or adjusted under 35 U.S.C. 154(b) by 2452 days.

(21) Appl. No.: 09/970,600

(22) Filed: Oct. 4, 2001

(65) Prior Publication Data

US 2002/0073022 A1    Jun. 13, 2002

Related U.S. Application Data

(60) Provisional application No. 60/241,558, filed on Oct. 13, 2000.

(51) Int. Cl.
*G06Q 40/00* (2012.01)
(52) U.S. Cl.
USPC ............ 705/38; 705/39; 705/40; 705/65; 235/375
(58) Field of Classification Search
USPC .................. 705/38, 39–40, 65; 235/375
See application file for complete search history.

(56) References Cited

U.S. PATENT DOCUMENTS

| 6,352,205 | B1 * | 3/2002 | Mullins et al. ........... 235/472.03 |
| 6,422,462 | B1 * | 7/2002 | Cohen ........................ 235/381 |
| 7,006,993 | B1 * | 2/2006 | Cheong et al. .................. 705/38 |
| 2001/0034720 | A1 * | 10/2001 | Armes .......................... 705/65 |
| 2003/0097331 | A1 * | 5/2003 | Cohen ........................... 705/39 |
| 2005/0035193 | A1 * | 2/2005 | Gustin et al. ................. 235/379 |
| 2005/0192896 | A1 * | 9/2005 | Hutchison et al. .............. 705/40 |

* cited by examiner

*Primary Examiner* — Harish T Dss
(74) *Attorney, Agent, or Firm* — DLA Piper LLP (US)

(57) ABSTRACT

An e-commerce transaction system accommodates transactions between a consumer and merchant without requiring that the consumer provide any sensitive credit card or other personal information. The transaction is carried out by a system provider. The consumer opens an account with the system provider and is provided with an account number and access code. The consumer uses the account number and access code in transactions with the merchant. The merchant communicates with the system provider to verify the customer information and to obtain payment on the transaction. The system provider communicates with a credit card bank to verify credit card information of the consumer and to debit a certain amount to be held in the customer account for later transactions.

11 Claims, 3 Drawing Sheets

SYSTEM AND METHOD FOR ON-LINE PAYMENT TRANSACTIONS

CROSS-REFERENCE TO RELATED APPLICATIONS

This application claims priority from U.S. provisional patent application Ser. No. 60/241,558 filed Oct. 13, 2000, which is incorporated by reference herein.

BACKGROUND OF THE INVENTION

1. Field of the Invention

The present invention relates generally to on-line transactions and more particularly to the manner of payment utilized in on-line transactions.

2. Brief Description of the Prior Art

Networks, such as the Internet and World Wide Web (hereafter "e-commerce"), have become increasingly popular for all types of consumer transactions, such as purchase of various products and services. The primary reasons why e-commerce transactions have become so popular are due to the convenience that the consumer is able to access an unlimited amount of information and can purchase all types of products and services from a single location.

Some problems have been noted with e-commerce transactions due to security concerns. For example, most e-commerce transactions are carried out by having the consumer provide credit card information to a merchant. Potentially, the consumer credit card information can be obtained by hackers at the time the credit card information is transmitted from the consumer to the merchant. To counteract this problem, different security schemes have been implemented to protect the credit card information, such as various encryption techniques. These techniques, however, can still provide insufficient security to prevent improper access of a consumer's credit card information.

Accordingly, there is a need for creating a more secure mechanism to accommodate e-commerce transactions.

SUMMARY OF THE INVENTION

The present invention discloses a payment alternative for on-line e-commerce transactions. In the embodiments disclosed herein, one advantage is that a secure on-line transaction can be created to protect consumer information, such as credit card information.

DETAILED DESCRIPTION OF THE PREFERRED EMBODIMENTS

Figure 1:
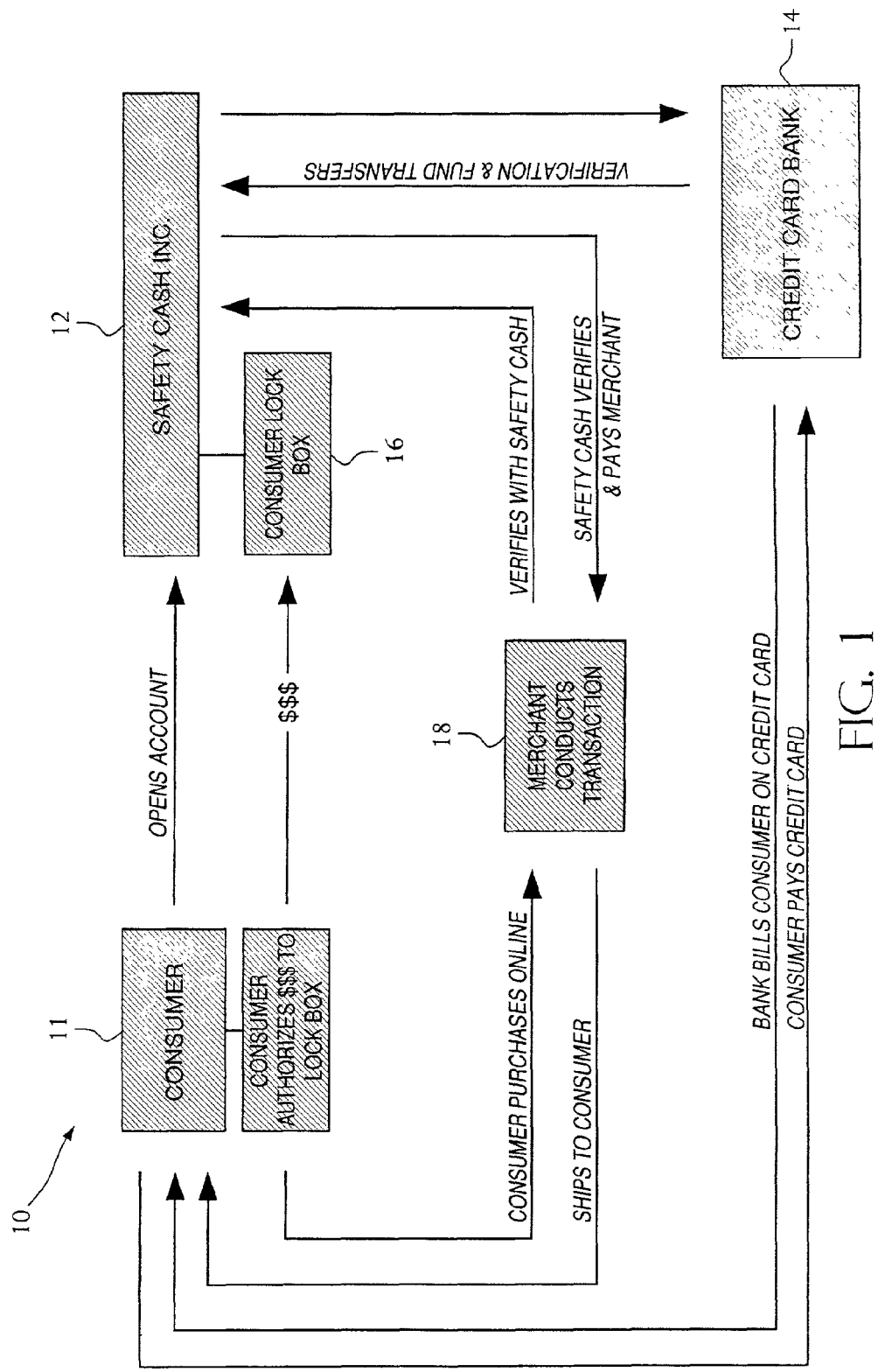
FIG. 1 is a block diagram illustrating one embodiment of an e-commerce transaction system in accordance with the present invention.

Referring now to the drawings in detail, wherein like reference numerals indicate like elements throughout the several views, there is illustrated in FIG. 1 an embodiment of an e-commerce transaction system in accordance with the present invention. As will be described in detail herein, the e-commerce transaction system 10 provides a secure on-line payment alternative for all e-commerce transactions. In this embodiment, payment security between consumers and vendors can be maintained through use of an on-line Stored Value Lock Box (SVLB). Consumers can credit or "fill" their SVLB through any of a variety of available mechanisms, such as by phone, mail or the Internet. A system provider then contacts the consumers' credit card issuing bank preferably electronically and receives authorization for the credit amount. Maximum amounts for the SVLB account can be established at any time, such as when the account is opened by the consumer, and also the amount may be updated. When the SVLB account is filled, the consumer can then proceed to make purchases on-line, such as through a commercially available network service provider, as will be described below.

In this embodiment, when a consumer orders on-line from a merchant, the consumer preferably inputs the SVLB in lieu of a credit card number and a merchant contacts the system provider, such as electronically as is normally accomplished for a conventional credit card transaction or by direct input to the system provider, such as through the Internet. The provider first verifies the SVLB for the credit amount and then authorizes and approves the transaction. The system then contacts the credit card issuing bank, directs funds to the appropriate SVLB and transfers the funds, preferably electronically, to the merchant, and more preferably less a discount fee. At the same time, the provider sends the transaction amount to the credit card bank, which then bills the consumer in the normal manner on their respective credit card accounts.

Preferably, in the present embodiment the transaction takes place with the merchant receiving only the SVLB number instead of the consumer's credit card number. The credit card issuing bank bills the consumer on the bank's standard billing procedures with only the amount of the transaction charged to the provider in lieu of the merchant. Consumers can make multiple purchases and to the same or different vendors, such as on multiple on-line purchase sites, until the credit limit of the SVLB is reached. Consumers can then "replenish" the SVLB with a new amount of credit (preferably up to the authorized limit) or allow the SVLB to become inactive.

A presently preferred embodiment of an e-commerce transaction system is illustrated in FIG. 1. In this embodiment, the e-commerce transaction system 10 as illustrated preferably operates in the following manner. A consumer 11 opens an account with a system provider 12, which applicant has termed SafetyCash in the present embodiment. In this embodiment, the provider 12 requires that the consumer 11 have an existing credit card with an established credit card issuer. The provider 12 preferably electronically contacts the consumer's credit card issuer 14 in order to verify the account information. The provider then creates an electronic SVLB 16 for the consumer 11. The consumer 11 then authorizes the amount of credit that the SVLB will "hold" on account. This process can be completed by various different types of transactions, such as for example, on-line, in person, by mail, phone, fax or e-mail. With the establishment of the SVLB 16, the consumer 11 is preferably given an SVLB number and an access code to the SVLB account. In this embodiment, the consumer is now ready to make purchases on-line.

The following will illustrate the manner by which transactions are made. The consumer 11 preferably accesses the merchant's e-commerce web site 18 and then conducts shopping and selection in the merchant's standard operating procedure for on-line purchasing. When the purchase selection is made, the consumer 11 preferably enters the SVLB number in place of the credit card number. The consumer 11 also preferably enters the SVLB access code, in place of the credit card expiration date. The merchant 18 in this embodiment then electronically routes the SVLB and access code supplied by the consumer 11 along with the purchase amount into the system, as it would for a standard credit card purchase, or alternatively through a direct Internet contact to a secured processing center of the provider 12. On the provider 12's receipt of the purchase information from the merchant 18, the indicated SVLB number is then verified for the authorized credit amount and authenticity of the access code. With this verified information, the provider 12 then preferably routes the dollar amount of the transaction to the consumer's credit card issuer 14, and has the amount wired to the provider 12. The provider 12 then transfers the "funds" less any discounted fee to the merchant 18.

The following will describe the manner by which the consumer is billed. In this embodiment, preferably the credit card bank 14 debits the consumer's existing credit card for the amount electronically transferred to the provider 12. Billing and payment are completed within the credit card bank's normal business operation procedures. The consumers then accordingly pay the credit card bills in the usual manner.

The following illustrates the foregoing system with reference to one exemplary embodiment from a consumer's perspective. For example, for purposes of this illustration, a consumer by the name of Ms. Joan Q. Public has a Visa credit card from bank-X with a credit limit of $500. She decides to open a SafetyCash account. First, Ms. Public logs onto the system provider's web site and enters her name and Visa number. This will be the last time she needs to put her credit card number over the Internet and the amount she wishes to have in the SVLB (i.e. $500). As indicated above, the information can be provided other ways as well, such as by mail, phone, etc. The provider then connects to bank-X and verifies the information. The provider then opens the SVLB for Ms. Public and sends via e-mail information regarding the SVLB use. Second, Ms. Public then goes to a merchant's on-line purchase site and selects $200 of merchandise. When the merchant requests the credit card number and expiration date, Ms. Public enters the SVLB number and access code. The merchant's system routes the information to the provider's processing center. The provider contacts bank-X and verifies a $200 charge to Ms. Public's credit card and bank-X electronically transfers the amount to the provider. The provider transfers $198.00 to the merchant ($200.00 less a 2% discount). The merchant then ships the merchandise on Ms. Public's instructions. Third, Ms. Public receives bank-X's Visa statement on the typical billing cycle with a $200 charge from the provider. Ms. Public pays bank-X's statement as her normal Visa billing habit.

In other embodiments, the system can also include a Disposable Anonymous Credit Card (DACC), which, for example, is a cross between a conventional credit card and a prepaid phone card. A DACC can be purchased for a finite value, such as for example in a range between $20 to $200. The DACC preferably has no name or other customer information associated with it. The DACC can also include an account number printed on the card and/or a magnetic strip or similar device that contains the account number. The DACC can also be in the form of a smart card or otherwise programmable so as to allow input of any desired credit amount and at any time. Advantageously, if the card or account number is stolen, then the only potential loss is the value of the DACC. The DACC can then be used in the same manner as a conventional credit card.

There are several advantages of the foregoing e-commerce transaction system.

1) The SafetyCash System is not in competition with any current financial service product, but rather an alternative vehicle for loan or credit generation.

2) The SafteyCash System meets the Demands of the Customer—Security, Convenience, and Anonymity.

3) The SafetyCash System allows financial service providers to immediately offer current and future customers new credit generating services for any existing infrastructure that the financial services provider currently has in place. This may include a credit card, debit card, smart card, check cashing card, or any other form of electronic account recording service (hereinafter called "credit cards"). The SafteyCash system can be rapidly formatted to opportunities for universal access whether through account numbers or wireless applications and will allow for authorized multiple users of single accounts.

4) The SaftetyCash system will allow for an increase in Market Demographics and Increase Security as it lower the financial service provider a greater customer base without increasing its risk analysis or charge-off rates.

For the consumer these include:
1. Consumer has complete anonymity. Merchandise can be shipped to the name and location of choice of the Consumer. The amount of information given to complete the transaction with the merchant, after the SVLB and the access number is in control of the consumer. Information on customer buying habits and personal information collected by merchant and credit card issuer is completely controlled by the consumer.
2. Consumer has the choice of a "trail-less" transaction, which can preclude the influx of unwanted on-line advertising and E-mails.
3. Consumer has immediate stop-loss as even if security is broken, the consumer can lose only what is in the SVLB, instead of the entire credit limit of their card.
4. Consumer can set up accounts for individuals (children for example) within their own credit card limit without risking the entire authorized credit limit for overdrafts.

For the Merchant:
1. Merchant will have a significant decrease in the cost of conducting transactions on line.
2. Advantages to consumers will increase on-line purchases and bring new consumers into the e-commerce market place, allowing merchants a higher return for their investment in e-commerce.

For the Credit Card Bank:
1. Credit cards remain the mainstay of e-commerce. Issuer will not lose accounts or have to make additional investment in existing infrastructure.
2. Higher use of credit cards as consumes gain comfort level with e-commerce and purchase more on-line.
3. Allows offering of new services to existing customers at minimum cost.
4. Provides reduced risk access to consumer market demographics outside of current customer profiles.

The following illustrates one embodiment of a system architecture utilized for accommodating the e-commerce transaction system noted above.

In the present embodiment, the e-commerce transaction system comprises a unique application of information system technologies and tangible components (i.e. hardware, software, electronic information networks and electronic media), such as those specific to high-volume secure electronic information exchanges involving financial transactions and retail purchases. The e-commerce system is operationally and technically unique in the orientation, arrangement and use of these components. The general architecture in accordance with the present embodiment is illustrated in the organizational responsibilities schematic shown in FIG. 2 and the technical connectivity/control schematic of FIG. 3.

Figure 2:
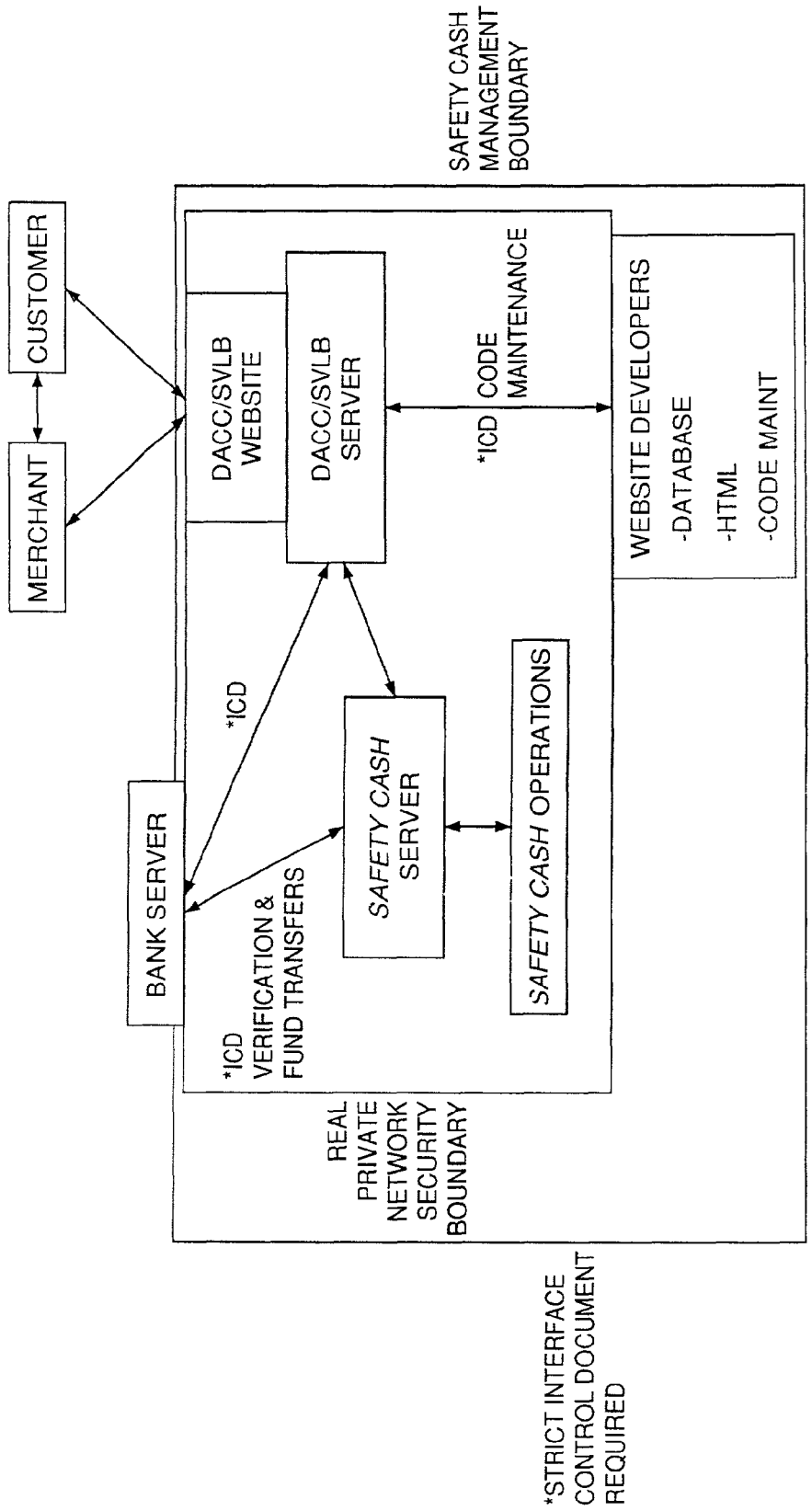
FIG. 2 is a block diagram illustrating an embodiment of the organizational relationship of the e-commerce transaction system of FIG. 1.

The organizational responsibilities schematic in FIG. 2 outlines a general technical layout of the e-commerce transaction system architecture, and the technical roles and responsibilities of the various organizational elements. Interface control responsibilities are also outlined.

Figure 3:
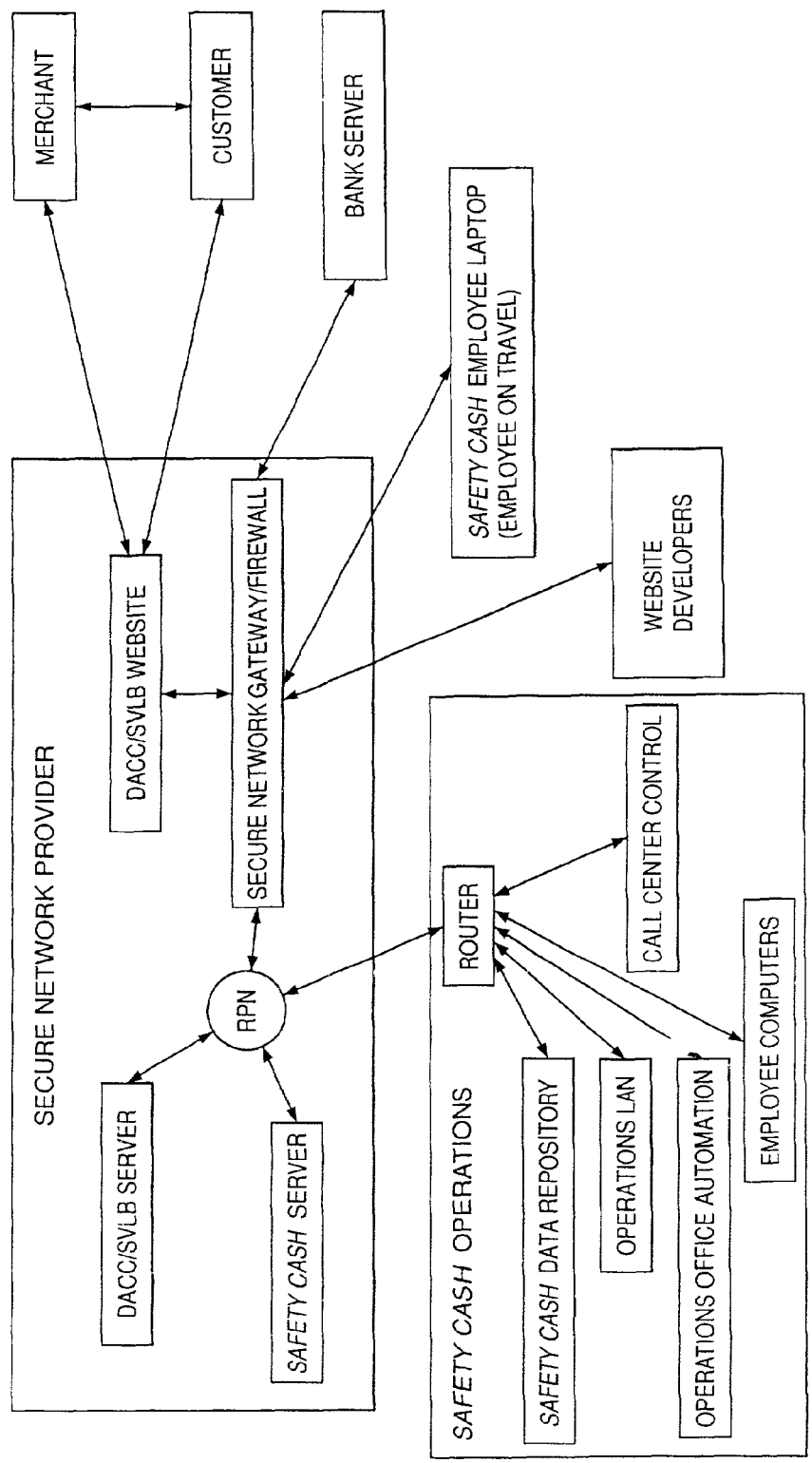
FIG. 3 is a block diagram illustrating an embodiment of the technology utilized to implement the e-commerce transaction system of FIG. 1.

The technical connectivity/control schematic in FIG. 3 outlines the general technical system elements, and forms the framework for transaction flow in accordance with the on-line payment process illustrated in FIG. 1.

The e-commerce transaction system in the present embodiment is preferably comprised of financial transaction industry standard high-volume computational hardware, secured network control, distribution and storage devices, robust system and application software, and secured climate controlled facilities for operational equipment hosting.

In this embodiment, the system's primary hardware is comprised of high-speed large data storage capacity servers, such as those that are standard in the emerging secure electronic financial transaction industry. As illustrated in FIGS. 2 and 3, the system also preferably requires high-speed routers, a secure network gateway and firewall equipment to preclude unauthorized access to account information and control. The primary system servers in this embodiment reside at the secure network provider facility and at the financial institution or bank, as illustrated in FIG. 3. The secure network provider servers control the information contained in the customer's SVLB. The secure network provider blocks unauthorized access while permitting authorized and coded access to information files for transaction query, initiation and verification via a real private network (RPN). An RPN is similar to a LAN, except that it joins computers not co-located in a sealed, secure environment. Any computer on the RPN can communicate with the other computers on the RPN. Computers connecting the RPN through a gateway/firewall can preferably only communicate with the RPN in ways allowed by the administrator. Also, anyone preferably can access the website. In this embodiment, the RPN houses the gateway and firewall which protects the information contained within each SVLB, and employs secure socket layer encryption techniques. The RPN is directly linked to the financial institution server. Information regarding transactions is securely routed to the SafetyCash operations via a secure network provider's RPN router.

In addition, in this embodiment, another advantage of the system of the present embodiment lies in its inherent low-impact to existing infrastructure. In the present embodiment, the system's primary software consists of industry standard information exchange applications and secure socket layer encryption applications hosted on UNIX and NT operating systems, with provisions for LINUX porting. There is very little developmental software required as the system takes advantage of the most robust operational system and application software available today, and blends smoothly with existing financial transaction industry infrastructure. The application software for database and account control is preferably housed and maintained on the primary system hardware, and controls the systems information protocols, storage, access and router control. Secure network provisional software protocols are preferably maintained and updated by the secure network provider.

For illustration purposes, the technical aspects of the present embodiment shown in FIGS. 2 and 3 will be described with reference to the transaction shown in FIG. 1.

As the consumer 11 opens an account with the provider 12, electronic contact and verification between the provider 12 and credit card bank 14 occurs between the SafetyCash server and the credit card bank's server via financial verification protocol software housed on both machines. Once verified, the application software preferably automatically establishes an SVLB on the DACC/SVLB server within the protected confines of the RPN. The application software on the DACC/SVLB server also preferably automatically establishes data space for the newly created customer account. The consumer 11 authorizes the system to enter the credit amount. The amount is verified with the credit card bank 14 by the system, then entered into the SVLB. Other than electronic authorization from the consumer, data can be entered by the system operations personnel via secure access to the RPN router.

The customer 11 accesses the merchant's e-commerce web site 18, such as by a any computer or similar device, such as a personal home computer, and makes a purchase selection. No system involvement occurs in this embodiment until the customer inputs their SVLB number and access code to the merchant. The merchant server contacts the DACC/SVLB data port for verification. This information passes onto the firewall where it is screened for authenticity. Once past the firewall screen, the information passes through the SafetyCash RPN and onto the DACC/SVLB server, where the application software conducts the balance calculation, and executes verification sub-routines. The application software then performs any discount fee calculations and commands the server to transfer the transaction information to the credit card bank 14 via the RPN and through the secured gateway. Upon receipt of this information, the credit card bank's application software commands a transfer of funds to the SafetyCash server via the RPN. Following receipt of the credit card bank's transfer of funds, the application software again performs discount fee calculations, and commands the server to transfer the remainder of the funds to the merchant server.

The terms "server", "computer", "computer system" or "system" as used herein should be broadly construed to include any device capable of receiving, transmitting and/or using information, including, without limitation, a processor, microprocessor or similar device, a personal computer such as a laptop, palm, PC, desktop or workstation, a network server, a mainframe, and an electronic wired or wireless device. Further, a server, computer, computer system, or system of the invention may operate in communication with other systems over any type of network, such as, for example, the Internet, an intranet, or an extranet, or may operate as a stand-alone system.

It is understood, therefore, that the present invention is susceptible to many different variations and combinations and is not limited to the specific embodiments shown in this application. In addition, it should be understood that each of the elements discloses all do not need to be provided in a single embodiment, but rather can be provided in any desired combination of elements where desired. It will also be appreciated that a system in accordance with the invention can be constructed in whole or in part from special purpose hardware or from conventional general purpose hardware or any combination thereof, any portion of which may be controlled by a suitable program. Any program may in whole or in part be comprised of or be stored on a system in a conventional manner, or remain whole or in part be provided into the system over a network or other mechanism for transferring information in a conventional manner. Accordingly, it is understood that the above description of the present invention is susceptible to considerable modifications, changes, and adaptations by those skilled in the art and that such modifi-

The invention claimed is:

1. A computer implemented method for payment transactions between a consumer and a merchant comprising the steps of:
   a system provider computer verifying electronically and over a computer network, that the consumer has an established credit card account;
   the system provider computer creating, over a computer network, an electronic lock box account, wherein the lock box account is associated with the consumer and comprises an electronic account into which data is stored relating to the consumer and no funds are stored, wherein the consumer credit card account is stored in the lock box account;
   the system provider computer establishing, over a computer network, a purchasing limit and a lockbox account number, and storing, over a computer network, the purchasing limit and the lockbox account number within the lock box account;
   the consumer, the system provider computer and the merchant executing, over a computer network, a purchase transaction between the consumer and the merchant comprising:
   entering the lock box account number;
   routing the dollar amount of the purchase transaction and the entered lock box account number to the lockbox;
   verifying that the dollar amount of the purchase transaction is within the established purchasing limit and that the entered account number matches the entered lock box account number; and
   completing the purchase transaction if the amount of the purchase transaction is within the established purchasing limit stored in the lock box account; and
   the system provider computer, a consumer's credit card bank computer and the merchant settling, over a computer network, the transaction with the consumer's credit card account, wherein the settling step comprises:
   requesting funds from the consumer's established credit card account corresponding to the amount of the purchase transaction; and
   routing funds corresponding to the amount of the purchase transaction directly from the consumer's credit card account to the merchant.

2. The computer implemented method according to claim 1 further comprising the steps of:
   the system provider computer, after the step of requesting funds from the consumer's established credit card account, receiving the requested funds from the consumer's established credit card account;
   the system provider computer routing the funds to the merchant by wiring the purchase dollar amount of the purchase transaction to the merchant less a discount fee; and
   the system provider computer reducing the established purchasing limit in the lock box by the purchase dollar amount.

3. The computer implemented method according to claim 1, wherein the credit card account comprises any of one or more accounts consisting of a credit card account, a debit card account, a smart card account, a check cashing card account or an electronic account recording service.

4. The computer implemented method according to claim 3, wherein the lockbox account number further comprises a lock box account access code.

5. The computer implemented method according to claim 4, wherein the only information needed by the lock box to verify the purchase transaction is the established lock box account number, the entered lock box account number, the established lock box account access code, the entered lock box account access code, the established dollar purchase amount and the transaction dollar purchase amount.

6. The computer implemented method according to claim 1, further comprising the system provider computer reducing the established purchasing limit in the lock box by the amount of the purchase transaction.

7. The computer implemented method according to claim 1, further comprising establishing the amount of the purchasing limit stored in the lock box by the consumer.

8. A system for e-commerce transactions comprising:
   a network comprising, in communication, a consumer computer, a merchant computer, a credit card bank computer and a system provider computer;
   the consumer computer in communication with the system provider computer for creating a lock box account, establishing a purchasing limit, and associating the purchasing limit with the lock box account;
   the system provider computer in communication with the credit card bank computer for verifying consumer credit card account information and for requesting and receiving funds for issuing payments to a merchant after a consumer executes a purchase transaction;
   the consumer computer in communication with the merchant computer for executing purchase transactions totaling up to the established purchasing limit; and
   the system provider computer in communication with the merchant computer for verifying consumer lock box account information and for issuing funds received from the credit card bank computer to pay for consumer purchase transactions;
   wherein the lock box does not store funds; and
   wherein the merchant computer does not have access to the credit card account and information regarding the credit card account.

9. The system for e-commerce transactions of claim 8, wherein the consumer computer is in communication with the system provider computer for establishing a lockbox account number and access code, and associating the lockbox account number and access code with the lock box account.

10. The system for e-commerce transactions of claim 9, wherein the consumer computer is in communication with the merchant computer for entering a lockbox account number and an access code during a purchase transaction.

11. The system for e-commerce transactions of claim 10, wherein the system provider computer is in communication with the merchant computer for verifying the lockbox account number and access code entered during the purchase transaction.

* * * * *